US009063401B2

(12) United States Patent
Kuriaki et al.

(10) Patent No.: US 9,063,401 B2
(45) Date of Patent: Jun. 23, 2015

(54) LASER LIGHT SOURCE PROJECTOR

(71) Applicants: Makoto Kuriaki, Tokyo (JP); Yasuhito Tanaka, Tokyo (JP); Hisanobu Miyanaga, Tokyo (JP)

(72) Inventors: Makoto Kuriaki, Tokyo (JP); Yasuhito Tanaka, Tokyo (JP); Hisanobu Miyanaga, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 13/760,822

(22) Filed: Feb. 6, 2013

(65) Prior Publication Data

US 2013/0271732 A1    Oct. 17, 2013

(30) Foreign Application Priority Data

Apr. 17, 2012  (JP) ................................. 2012-093462

(51) Int. Cl.
*G03B 21/20* (2006.01)
*G03B 21/16* (2006.01)
*H04N 9/31* (2006.01)

(52) U.S. Cl.
CPC ............ *G03B 21/2013* (2013.01); *G03B 21/16* (2013.01); *G03B 21/2033* (2013.01); *G03B 21/2053* (2013.01); *H04N 9/3158* (2013.01); *H04N 9/3161* (2013.01); *H04N 9/3155* (2013.01)

(58) Field of Classification Search
USPC ............ 353/31, 33, 34, 37, 85; 348/742, 743, 348/771; 362/231; 349/5, 7, 8, 9
See application file for complete search history.

(56) References Cited

U.S. PATENT DOCUMENTS

| 7,052,138 | B2 * | 5/2006 | Matsui ............................ 353/31 |
| 7,172,295 | B2 * | 2/2007 | Engle .............................. 353/85 |
| 2006/0050396 | A1 | 3/2006 | Yamakawa et al. |
| 2006/0215122 | A1 | 9/2006 | Hong |
| 2006/0274286 | A1 * | 12/2006 | Morejon et al. ................ 353/85 |
| 2007/0247594 | A1 | 10/2007 | Tanaka |
| 2010/0328616 | A1 * | 12/2010 | Silverstein et al. ............. 353/31 |
| 2011/0013041 | A1 * | 1/2011 | Abe et al. .................... 348/222.1 |
| 2011/0109667 | A1 * | 5/2011 | Kim et al. ...................... 345/690 |
| 2011/0221714 | A1 | 9/2011 | Kuriaki |
| 2011/0316890 | A1 | 12/2011 | Chen et al. |
| 2013/0070208 | A1 * | 3/2013 | Nakanishi ........................ 353/31 |
| 2014/0022516 | A1 * | 1/2014 | Mizuno .......................... 353/85 |
| 2014/0078474 | A1 * | 3/2014 | Nakao et al. .................... 353/33 |

FOREIGN PATENT DOCUMENTS

| CN | 101931822 A | 12/2010 |
| CN | 102193285 A | 9/2011 |
| CN | 102300101 A | 12/2011 |
| JP | 2006-78625 A | 3/2006 |
| JP | 2007-65574 A | 3/2007 |
| JP | 2008-193054 A | 8/2008 |
| JP | 2009-21551 A | 1/2009 |
| JP | 2011-191526 A | 9/2011 |
| WO | 2009/040822 A | 4/2009 |

* cited by examiner

*Primary Examiner* — William C Dowling
(74) *Attorney, Agent, or Firm* — Birch, Stewart, Kolasch & Birch, LLP

(57) ABSTRACT

A laser light source projector includes a plurality of light sources of color groups each including a plurality of laser light sources. The laser light source projector projects an image by driving the laser light sources in each of the color groups. In response to change of the light output characteristics of one or a plurality of laser light sources in an arbitrary color group, light output from a remaining laser light source in the arbitrary color group is adjusted, thereby keeping white balance constant.

2 Claims, 5 Drawing Sheets

F I G . 1
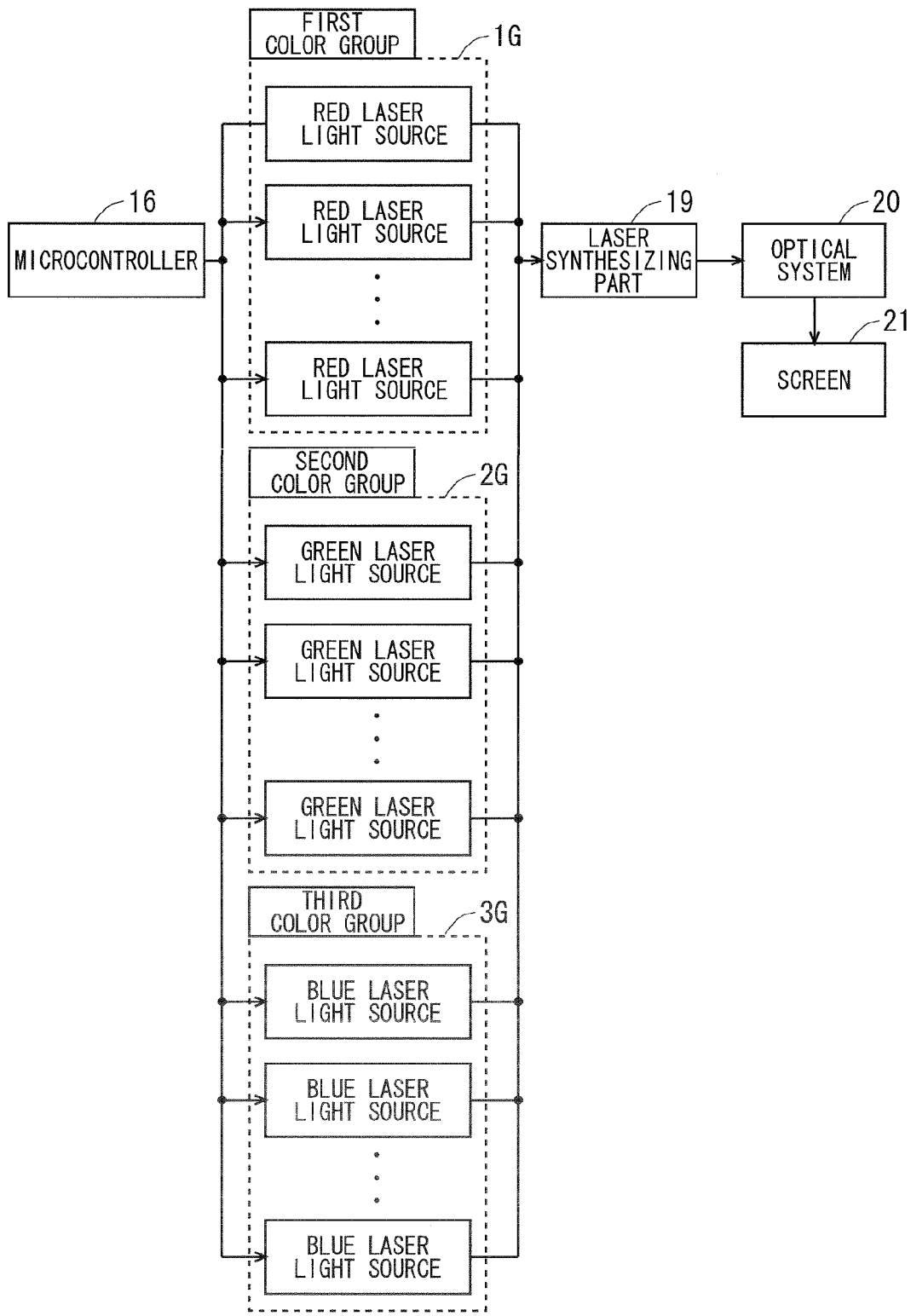

F I G . 4
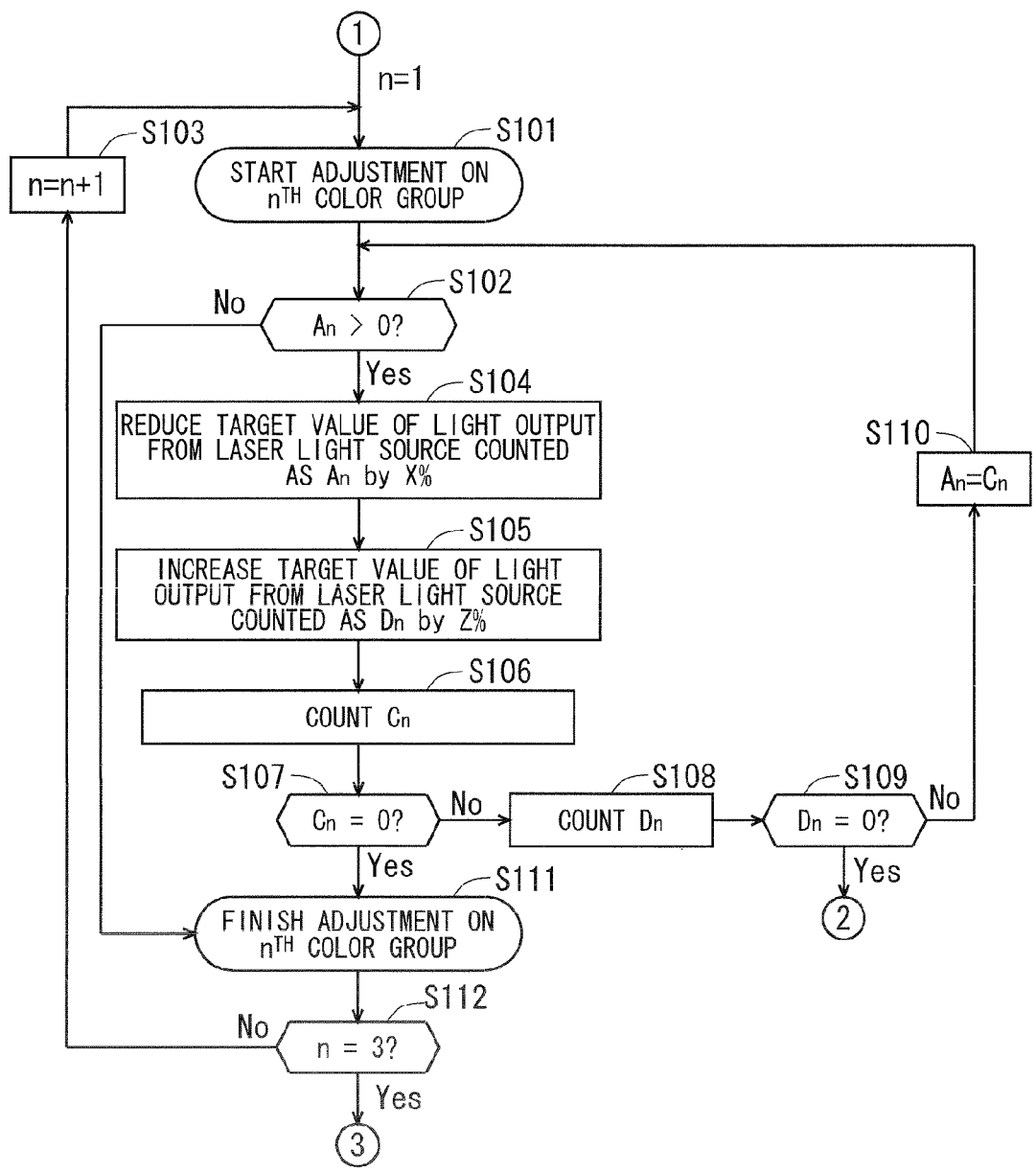
F I G . 5
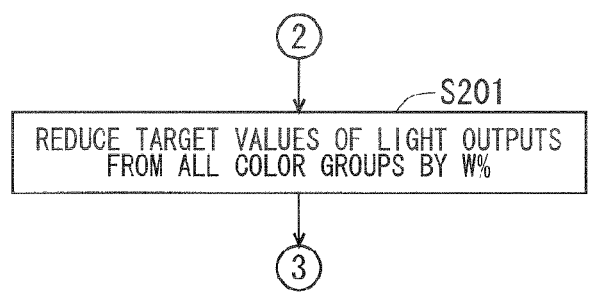

LASER LIGHT SOURCE PROJECTOR

FIELD OF THE INVENTION

The present invention relates to a laser light source projector, and more specifically, to a laser light source projector that projects an image by driving a plurality of laser light sources.

BACKGROUND ART

It is known that some projectors that project and display images use respective laser light sources of red (R), green (G) and blue (B), for example, to form image light. If the light output characteristics of a laser light source are degraded due to aging deterioration or temperature change of a laser element, for example, a luminance ratio among respective light beams in R, G and B may be changed while representation is shown in white, leading to a problem of fluctuations in white balance. Thus, in order to keep white balance properly, correction has been required in response to change of light output characteristics.

According to known technique relating to white balance correction, with respect to a light source deteriorated most seriously, light output from a remaining light source is made to agree with light output from the light source deteriorated most seriously to reduce luminance as a whole, thereby keeping white balance constant (Japanese Patent Application Laid-Open No. 2007-65574).

According to known technique employed to control the temperature of a laser light source, light output from the laser light source is reduced if the operating rate of a Peltier element unit for cooling the laser light source reaches a predetermined value, thereby suppressing temperature increase of the laser light source (Japanese Patent Application Laid-Open No. 2011-191526).

The aforementioned technique described in Japanese Patent Application Laid-Open No. 2007-65574 is employed to correct the white balance of a projector that uses a single laser light source as a light source for each of R, G and B. Thus, this conventional technique cannot be employed to correct the white balance of a projector that uses a plurality of laser light sources as light sources for each of a plurality of colors.

SUMMARY OF THE INVENTION

It is an object of the present invention to provide a laser light source projector that drives a plurality of laser light sources. If light output from one or a plurality of light sources is reduced due to aging deterioration thereof, for example, the laser light source projector makes it possible to keep white balance properly by adjusting light output from a remaining light source in a normal condition.

A laser light source projector of the present invention is a laser light source projector that includes a plurality of light sources of color groups each including a plurality of laser light sources. The laser light source projector projects an image by driving the laser light sources in each of the color groups. In response to change of the light output characteristics of one or a plurality of laser light sources in an arbitrary color group, light output from a remaining laser light source in the arbitrary color group is adjusted, thereby keeping white balance constant.

In the laser light source projector of the present invention, if the light output characteristics of one or a plurality of laser light sources in the arbitrary color group are degraded to reduce light output, light output from a laser light source belonging to the arbitrary color group and having light output characteristics not degraded is increased to compensate for the reduction of the light output. Thus, the light output from the arbitrary color group as a whole is not reduced and can be kept at the same level. As a result, a difference in luminance among the color groups is not generated, so that white balance can be kept constant.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a functional block diagram of a laser light source projector of a preferred embodiment of the present invention;

FIG. 4 is a second flow chart relating to the white balance correction of the preferred embodiment of the present invention;

FIG. 5 is a third flow chart relating to the white balance correction of the preferred embodiment of the present invention.

EMBODIMENT FOR CARRYING OUT THE INVENTION

<Preferred Embodiment>
<Structure>

FIG. 1 is a functional block diagram of a laser light source projector of a preferred embodiment. The laser light source projector of the preferred embodiment includes a plurality of laser light sources divided into first, second and third color groups according to colors of laser light beams. The first color group 1G includes $N_1$ red laser light sources, the second color group 2G includes $N_2$ green laser light sources, and the third color group 3G includes $N_3$ blue laser light sources. These laser light sources are driven under control of a microcontroller 16.

Light outputs from all the laser light sources are synthesized by a laser synthesizing part 19. The laser synthesizing part 19 is composed of a mirror, a prism, or a rod integrator, for example.

Figure 2:
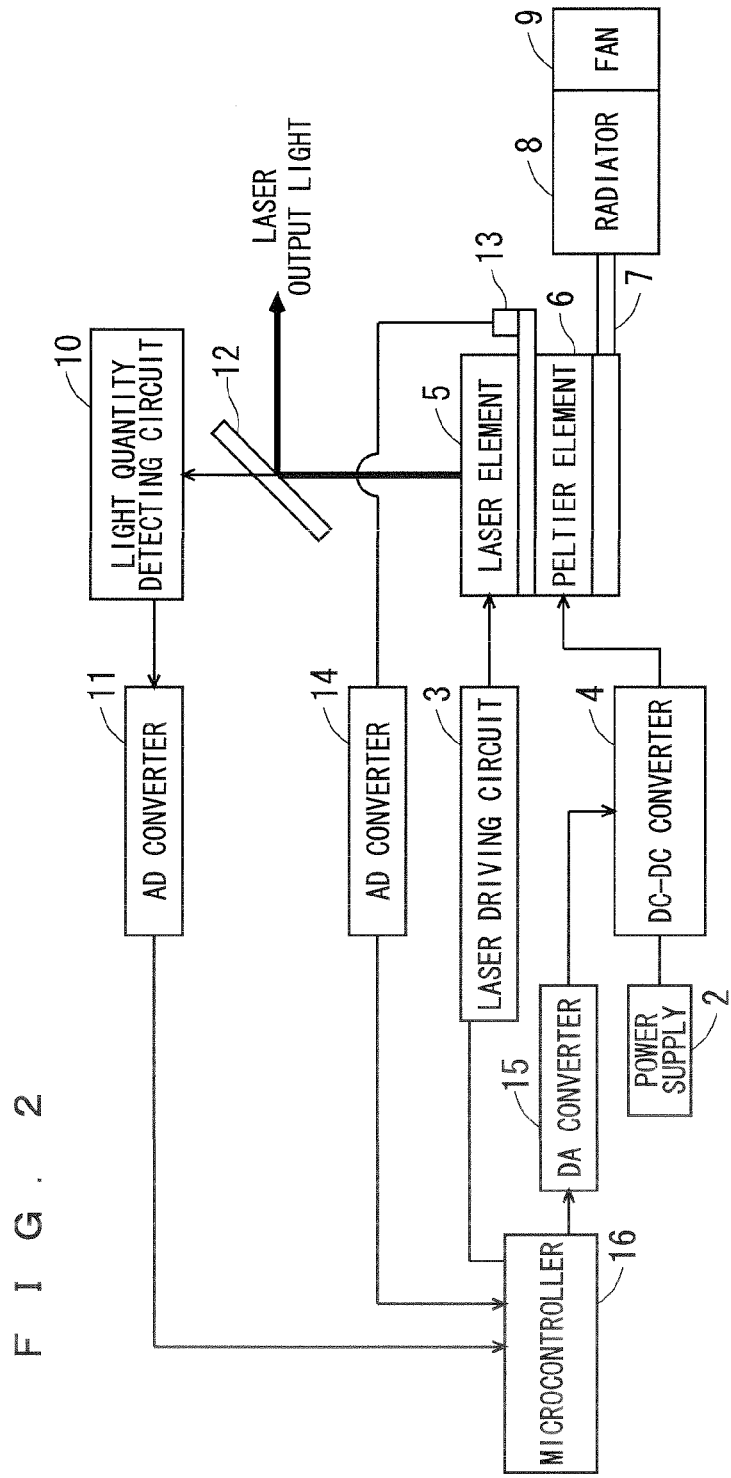
FIG. 2 is a functional block diagram of a laser light source of the laser light source projector of the preferred embodiment of the present invention.

The synthesized laser light is subjected to process such as modulation by a certain optical system 20, and is projected on a screen 21. The optical system 20 is a liquid crystal panel functioning as an optical modulator or a projection lens for projecting modulated light, for example. FIG. 2 is a functional block diagram of an arbitrary laser light source shown in FIG. 1. A laser element (hereinafter called LD) 5 for generating a laser light beam is driven by the microcontroller 16 through a laser driving circuit 3. Part of a laser light beam emitted from the LD 5 reflects off a half mirror 12, is output from the laser light source, and is synthesized with laser light beams emitted from the other laser light sources. The light beam having passed through the half mirror 12 enters a light quantity detecting circuit 10. Data about the detected light quantity is given to the microcontroller 16 through an AD converter 11. The microcontroller 16 controls a signal to be given to the laser driving circuit 3 so as to keep light output from the LD 5 constant.

The temperature of the LD 5 is detected by a temperature detecting circuit 13, converted to data by an AD converter 14, and given to the microcontroller 16. The microcontroller 16 controls driving of a Peltier element 6 through a DA converter 15 such that the LD 5 is kept in a constant temperature. The Peltier element 6 is driven by a power supply 2 through a DC-DC converter 4. Heat generated at the Peltier element 6 is transferred through a heat pipe 7 to a radiator 8, and is dissipated by a fan 9.

<Operation>

The light quantity detecting circuit 10 of each laser light source stores a target value of light output from the laser light source itself. The microcontroller 16 performs feedback control through the laser driving circuit 3 such that the light output from the laser light source agrees with the target value. As an example, if data about the light output obtained from the light quantity detecting circuit 10 falls below the target value, the microcontroller 16 increases a current ($I_D$) to flow in the LD 5 to increase the light output, thereby making the light output agree with the target value. The light output is increased or reduced in response to change of the target value of the light output.

As described above, the temperature of the LD 5 is always controlled to be kept at a constant temperature. Meanwhile, if an ambient temperature increases suddenly, the Peltier element 6 becomes incapable of exhibiting its cooling capability sufficiently, thereby generating temperature increase of the LD 5.

Aging deterioration or temperature increase of the LD 5 degrades the light output characteristics of a laser light source including this LD 5, thereby reducing light output. In this case, the microcontroller 16 performs the aforementioned feedback control to increase the current $I_D$ in order to keep the light output at the target value. If the current $I_D$ reaches a limiting current ($I_{MAX}$), the laser light source is placed in a saturated condition where the light output stops increasing despite further increase of the current $I_D$, to be specific, placed in a condition where the light output characteristics thereof are degraded, failing to satisfy the target value of the light output. The presence of a laser light source failing to satisfy a target value of its light output generates a difference in light output, namely, a difference in luminance among the color groups, thereby changing white balance. The limiting current value ($I_{MAX}$) of the LD 5 of each laser light source is stored in advance in the microcontroller 16.

<White Balance Correction>

Thus, in the preferred embodiment, white balance correction is performed in addition to the aforementioned control. The white balance correction is intended to keep white balance constant by controlling a target value of light output from each laser light source such that each laser light source is not placed in the saturated condition. The white balance correction is performed at certain time intervals, for example. Or, the white balance correction may be performed if an ambient temperature changes by degrees greater than predetermined degrees, or if the number of laser light sources in the saturated condition reaches a predetermined number.

The white balance correction includes three corrections: increasing correction, reducing correction, and recovering correction. In the increasing correction, output reduction of a laser light source in the saturated condition belonging to an arbitrary color group is compensated for by increasing output from a remaining laser light source belonging to the arbitrary color group, thereby keeping white balance constant. The reducing correction is performed if the increasing correction is not feasible. In the reducing correction, light outputs from all the color groups are reduced to keep white balance constant. The recovering correction is performed if all the laser light sources escape from the saturated condition after the reducing correction. In the recovering correction, light outputs from all the color groups are increased to recover luminance while white balance is kept constant.

Following cases are described below for explanation of the white balance correction by referring to flow charts (FIGS. 3 to 6): the case where there is a laser light source in the saturated condition so having degraded light output characteristics (A>0), and the case where there is no such a laser light source (A=0). Here, A is a total of the number of laser light sources ($A_1$) in the saturated condition belonging to the first color group 1G corresponding to red, for example, the number of laser light sources ($A_2$) in the saturated condition belonging to the second color group 2G corresponding to green, for example, and the number of laser light sources ($A_3$) in the saturated condition belonging to the third color group 3G corresponding to blue, for example.

<If There is Laser Light Source Having Degraded Light Output Characteristics>

Figure 3:
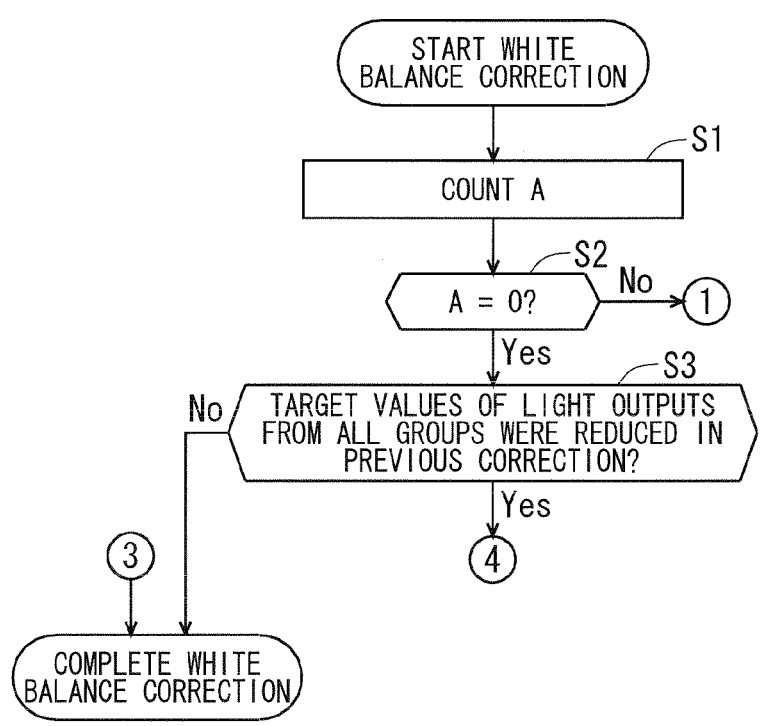
FIG. 3 is a first flow chart relating to white balance correction of the preferred embodiment of the present invention.
Figure 6:
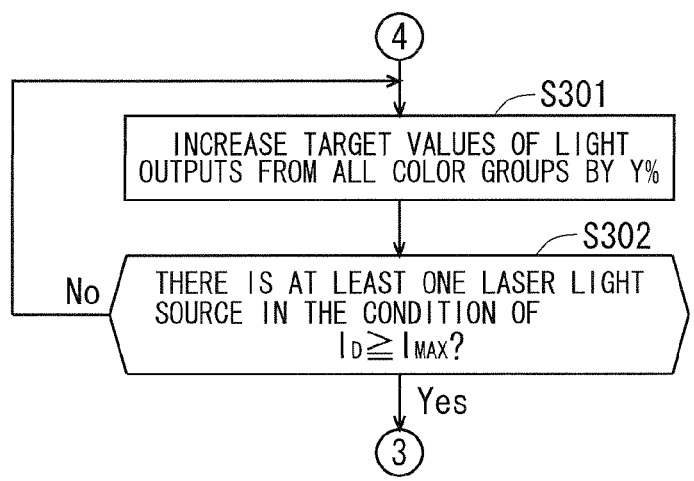
FIG. 6 is a fourth flow chart relating to the white balance correction of the preferred embodiment of the present invention.

If it is determined as a result of step S1 of FIG. 3 that there is a laser light source having degraded light output characteristics, specifically, that there is a laser light source in the saturated condition, and more specifically, that A is not zero, the flow proceeds to step S101 (FIG. 4). First, light output from an $n^{th}$ color group (n being one means red, n being two means green, and n being three means blue, for example) is adjusted (step 101). Actually, light output from the first color group 1G is adjusted as n is set as one in advance.

In step S102, it is determined if the number of laser light sources ($A_n$) in the saturated condition ($I_D \geq I_{MAX}$) belonging to the $n^{th}$ color group exceeds zero. If $A_n$ is zero, there is no deteriorated laser light source in the $n^{th}$ color group. In this case, light output from the $n^{th}$ color group is not required to be adjusted. So, adjustment of the light output from the $n^{th}$ color group is finished (step S111), and the flow proceeds to step S112. If it is determined in step S112 that n is not three, one is added to n in step S103, and then correction is performed on a next group. In contrast, if it is determined that n is three, adjustment of light outputs from all the color groups is finished. So, in this case, the white balance correction is completed.

If it is determined in step S102 that $A_n$ is greater than zero, a target value of light output from a laser light source counted as $A_n$ is reduced by X % in step S104. Here, X is a constant number, and may be four, for example.

Here, the number of laser light sources not having been in the saturated condition since start of adjustment of the $n^{th}$ color group is defined as $D_n$. In step S105, a target value of light output from a laser light source counted as $D_n$ is increased by Z %. Here, Z is obtained from the following formula:

$$Z = XA_n/D_n \quad (1)$$

Next, in step S106, the number of laser light sources ($C_n$) is counted that have been brought into the saturated condition ($I_D \geq I_{MAX}$) as a result of increase of the target value of the light output in step S105.

It is determined in step S107 if $C_n$ is zero. $C_n$ being zero means that reduction of the light output from the laser light source in the saturated condition could be compensated for by increasing light output from a remaining laser light source without bringing the remaining laser light source into the saturated condition. Thus, if $C_n$ is zero, adjustment of light output from the $n^{th}$ color group is finished (step S111). Then, the flow proceeds to step S112. If n is not three, one is added to n in step S103, and then correction is performed on a next group. In contrast, if n is three, adjustment of light outputs from all the color groups is finished. So, in this case, the white balance correction is completed.

If it is determined in step S107 that $C_n$ is not zero, a laser light source newly brought into the saturated condition ($I_D \geq I_{MAX}$) should be targeted for the correction. So, in step S108, the number of laser light sources not having been in the saturated condition ($D_n$) since start of adjustment is counted. Then, in step S109, it is determined if $D_n$ is zero. If $D_n$ is not zero, in order to compensate for reduction of light output from the laser light source counted as $C_n$ with the laser light source counted as $D_n$, the value of $A_n$ is replaced by the value of $C_n$ (step S110), to be specific, the number of laser light sources having degraded light output characteristics is counted as $A_n$. Then, the flow returns to step S102 to perform adjustment again.

In contrast, $D_n$ being zero means that light outputs from all the laser light sources in the $n^{th}$ color group have reached their upper limits. So, if $D_n$ is zero, reduction of the light output from the laser light source counted as $C_n$ cannot be compensated for with a remaining laser light source. Thus, the flow proceeds to step S201 (FIG. 5) to reduce target values of light outputs from all the color groups by W % uniformly. Accordingly, target values of light outputs from laser light sources in all the color groups are also reduced by W % uniformly. Then, the white balance correction is completed. Reducing light outputs from all the color groups uniformly makes it possible to keep white balance constant. The value of the aforementioned W is set for example at four that does not generate visual recognition of luminance change.

<If There is No Laser Light Source Having Degraded Light Output Characteristics>

If it is determined in step S2 of FIG. 3 that there is no laser light source having degraded light output characteristics, namely, that A is zero, it is determined if target values of light outputs from all the color groups were reduced in previous white balance correction (step S3). Adjustment is not necessary if the target values of light outputs from all the color groups were not reduced. So, in this case, the white balance correction is completed.

In contrast, if the target values of light outputs from all the color groups were reduced, specifically, if step S201 (FIG. 5) was performed in the previous control of the target values of the light outputs, the target values of the light outputs from all the color groups are increased by Y % uniformly. Accordingly, target values of light outputs from laser light sources in all the color groups are also increased by Y % uniformly. The value of Y is determined to be smaller than that of the aforementioned W, and is set at 0.25, for example.

Next, in step S302, it is determined if all the laser light sources are in the saturated condition ($I_D \geq I_{MAX}$). If there is no laser light source in the saturated condition, it is determined that light output can be increased further. Then, the flow returns to step S301. As a result, light output is recovered gradually.

In contrast, if it is determined in step S302 that there is at least one laser light source in the saturated condition ($I_D \geq I_{MAX}$), it is determined that light output has reached its upper limit, and the white balance correction is completed.

As described above, light output that was reduced once is recovered, and this recovery is performed for example in the case as follows. If the light output characteristics of a laser light source are degraded temporarily due to sudden increase of an ambient temperature, light output as a whole is reduced once. Then, after the degraded light output characteristics of the laser light source are recovered in response to reduction of the ambient temperature, the light output as a whole is recovered to a predetermined value.

<Effects>

A laser light source projector of the preferred embodiment is a laser light source projector including a plurality of light sources of color groups each including a plurality of laser light sources. The laser light source projector projects an image by driving the laser light sources in each of the color groups. In response to change of the light output characteristics of one or a plurality of laser light sources in an arbitrary color group, light output from a remaining laser light source in the arbitrary color group is adjusted, thereby keeping white balance constant.

If the light output characteristics of one or a plurality of laser light sources in the arbitrary color group are degraded to reduce light output, light output from a laser light source belonging to the arbitrary color group and having light output characteristics not degraded is increased to compensate for the reduction of the light output. Thus, the light output from the arbitrary color group as a whole is not reduced and can be kept at the same level. As a result, a difference in luminance among the color groups is not generated, so that white balance can be kept constant.

In the laser light source projector of the preferred embodiment, if light output from a laser light source in an arbitrary color group reaches its upper limit, light outputs from the laser light sources in all the color groups are reduced to keep white balance constant.

If the light output characteristics of one or a plurality of laser light sources in the arbitrary color group are degraded to reduce light output, and if the reduction of the light output cannot be compensated for with light output from a remaining laser light source belonging to the arbitrary color group, light outputs from all the color groups are reduced uniformly. As a result, white balance can be kept constant.

In the laser light source projector of the preferred embodiment, if the laser light source in the arbitrary color group escapes from a condition where the light output from this laser light source has reached its upper limit, light outputs from the laser light sources in all the color groups are increased, thereby recovering luminance while keeping white balance properly.

If the light output characteristics of one or a plurality of laser light sources in the arbitrary color group are degraded to reduce light output, and if the reduction of the light output cannot be compensated for with light output from a remaining laser light source belonging to the arbitrary color group, light outputs from all the color groups are reduced uniformly. If the light output characteristics of the laser light source having the degraded light output characteristics are recovered thereafter, light outputs from the laser light sources in all the color groups are increased uniformly. As a result, luminance can be recovered to a level before reduction of the light outputs while white balance is kept constant.

The preferred embodiment of the present invention can be modified or omitted where appropriate without departing from the scope of the invention.

While the invention has been shown and described in detail, the foregoing description is in all aspects illustrative and not restrictive. It is therefore understood that numerous modifications and variations can be devised without departing from the scope of the invention.

What is claimed is:

1. A laser light source projector comprising:

a plurality of light sources of color groups each including a plurality of laser light sources, the laser light source projector projecting an image by driving the laser light sources in each of said color groups; and, a controller which, in response to a detected change of the light output characteristics of one or a plurality of laser light sources in an arbitrary color group, adjusts light output from one or more of the remaining light sources of said color groups in such manner as to keep white balance constant by;

(a) adjusting light output from one or more of the remaining laser light sources in said arbitrary color group to achieve a desired white balance, (b) when (a) is decided to be unable to achieve the desired white balance while maintaining each of said laser light sources in said arbitrary light source out of a saturated condition, reducing light output from said laser light sources of all of said color groups in order to achieve the desired white balance while maintaining each of said plurality of light sources in all of said color groups out of the saturated condition, and (c) when (b) is decided to have achieved the desired white balance while maintaining each of said plurality of light sources in all of said color groups out of the saturated condition, increasing light output from said laser light sources of all of said color groups in such manner as to maintain the desired white balance.

2. The laser light source projector according to claim 1, wherein the controller continues to increase the light output from said laser light sources of all of said color groups according to (c) until at least one of said laser light source of any of said color groups reaches the saturated condition.

* * * * *